(No Model.)

H. J. HAYES & Z. J. DILLEY.
BICYCLE LEADER.

No. 577,749.        Patented Feb. 23, 1897.

Witnesses:
F. L. Ourand
Jo. L. Coombs

Inventors:
Hector J. Hayes
Zena J. Dilley
by James Sugger & Co.
Attorneys

UNITED STATES PATENT OFFICE.

HECTOR J. HAYES AND ZENA J. DILLEY, OF MUIR, MICHIGAN.

BICYCLE-LEADER.

SPECIFICATION forming part of Letters Patent No. 577,749, dated February 23, 1897.

Application filed July 20, 1896. Serial No. 599,853. (No model.)

*To all whom it may concern:*

Be it known that we, HECTOR J. HAYES and ZENA J. DILLEY, residents of Muir, in the county of Ionia and State of Michigan, have invented certain new and useful Improvements in Bicycle-Leaders; and we do hereby declare that the following is a full, clear, and exact description of the invention, which will enable others skilled in the art to which it appertains to make and use the same, reference being had to the accompanying drawings, which form a part of this specification.

Our invention relates to improvements in bicycle-leaders adapted to be attached to an ordinary bicycle for holding the front wheel in position when the bicycle is standing up and prevent its wabbling, so that in mounting and also in riding uphill or over rough places the wheels will be kept in alinement.

The invention consists in the novel construction and combination of parts hereinafter fully described and claimed.

Figure 1:
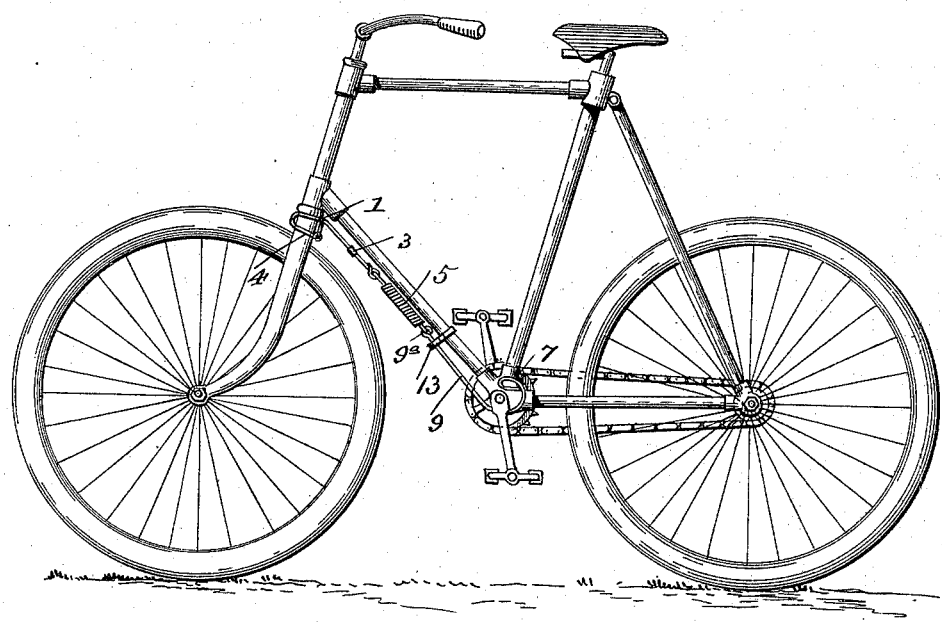
Figure 2:
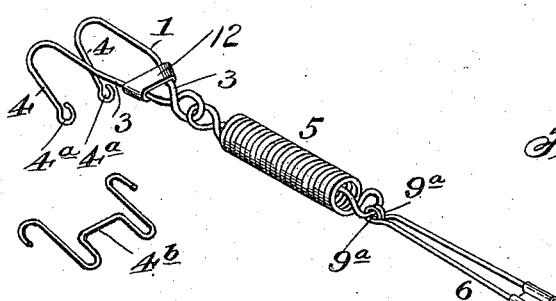
Figure 3:
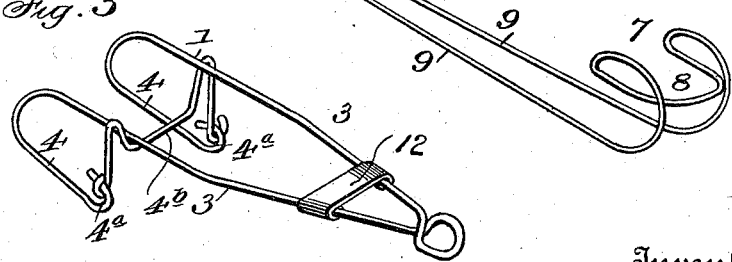

In the accompanying drawings, Figure 1 is a side elevation showing a bicycle with our improved leader applied thereto. Fig. 2 is a perspective view of the leader detached. Fig. 3 is a detail perspective view.

In the said drawings the reference-numeral 1 designates the front section of the leader, consisting of a piece of stout wire bent over at the center and twisted, forming a loop 2, and two diverging arms 3, the front ends of which are bent, as shown, forming two hooks 4 and having the extremities bent into eyes $4^a$, with which is connected a hook $4^b$, adapted to engage with the head of an ordinary bicycle. To the opposite or rear end of the loop 2 is secured a coiled spring 5, the other end of which is connected with the rear section 6 of the leader. This section consists of a piece of stiff wire bent at its center to form a hook 7, which is adapted to engage under the bearing of the sprocket-axle. The said wire is then curved upwardly and backwardly, forming curved arms 8, and then extended forwardly, forming converging arms 9, preferably considerably longer than the arms 3 of the front section, and the ends are bent into eyes or hooks $9^a$, which engage with the rear end of the coiled spring.

The numerals 10 and 12 designate clasps secured to the front and rear sections, respectively, for preventing the spreading of the arms thereof, and 13 designates a strap passing around the front end of the rear section and one of the bars of the bicycle-frame to assist in holding the leader in place.

In using the device the front end of the front section is connected with the head of the bicycle, the hooks 4 being at the opposite sides of the steering-bar and the hook $4^b$ bearing against the rear of the head. The hook 7 of the rear section engages under the bearing of the sprocket-axle. The tension of the coiled spring will tend to keep the front wheel alined with the rear wheel, so that in riding uphill or over rough ground the front wheel will be prevented from wabbling, while at the same time the bicycle can be guided by the steering and handle bars, as usual.

The device when in use will not be in the way of the rider and can be readily detached when desired.

Having thus fully described our invention, what we claim is—

1. The combination with a bicycle, of the leader comprising the coiled spring, the section connected with the front or upper end thereof consisting of two bent arms engaging with the head of the bicycle, and the rear section consisting of two arms bent into a hook which engages with the sprocket or crank axle bearing, substantially as described.

2. As an improved article, a leader for a bicycle consisting of the section bent at the center forming a loop and two converging arms the ends of which are bent into hooks adapted to be connected with a bicycle-head, the hook connected therewith, the coiled spring connected with said loop and the rear section consisting of a piece of wire bent to form a hook adapted to be connected with the sprocket-axle bearing, and then extended forwardly, forming two arms connected with the rear ends of said spring; substantially as described.

In testimony that we claim the foregoing as our own we have hereunto affixed our signatures in presence of two witnesses.

HECTOR J. HAYES.
ZENA J. DILLEY.

Witnesses:
JOHN DILLEY,
DANIEL L. TARBELL.